Figure 1:
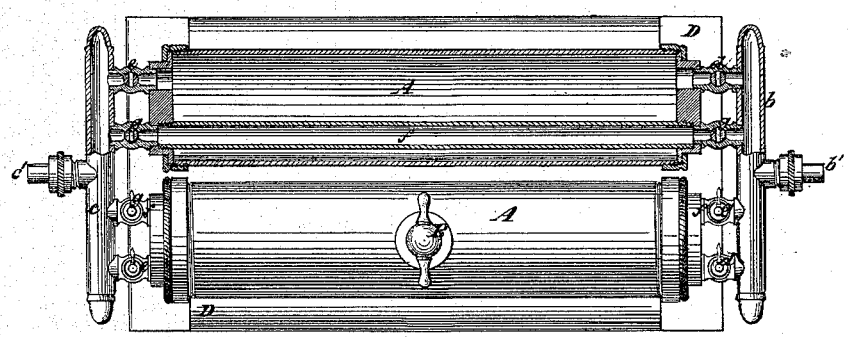

J. W. DOUGLAS.
Chemical Fire Extinguisher.

No. 97,894.

Patented Dec. 14, 1869.

United States Patent Office.

JOSEPH W. DOUGLAS, OF MIDDLETOWN, CONNECTICUT, ASSIGNOR TO W. DOUGLAS AND B. DOUGLAS, OF SAME PLACE.

Letters Patent No. 97,894, dated December 14, 1869.

IMPROVED APPARATUS FOR EXTINGUISHING FIRES BY MEANS OF CHEMICAL AGENTS.

The Schedule referred to in these Letters Patent and making part of the same.

*To all whom it may concern:*

Be it known that I, JOSEPH W. DOUGLAS, of Middletown, in the county of Middlesex, and State of Connecticut, have invented a new Apparatus for the Purpose of Extinguishing Fires by Chemical Agents; and I do hereby declare that the following is a full, clear, and exact description of the same, reference being had to the accompanying drawings, forming part of this specification.

The apparatus which forms the subject of this invention is intended to be used either for chemicals from which, when water is impregnated with them and thrown upon a fire, there is generated a gas which is capable of extinguishing combustion, or for chemicals from which, when water is thrown among them, there may be generated a gas of similar character.

The invention consists in a close vessel or holder, with a novel system or organization of pipes, stop-cocks, and connections, whereby a charge of chemicals can be placed in the vessel or holder, or such charge can be renewed therein without stopping the flow upon the fire of the stream of water which passes through the pipes of the apparatus.

It may be used in connection with the water-pipes within or belonging to a building, or with a street-hydrant, or with an ordinary fire-engine, or it may be used separate from a fire-engine, upon a suitable carriage or otherwise, in portable form, and may be either single or double; when double, providing for a continued supply of extinguishing-gas to the fire during the renewal of the charges of chemicals.

The drawing represents a double apparatus.

Figure 2:
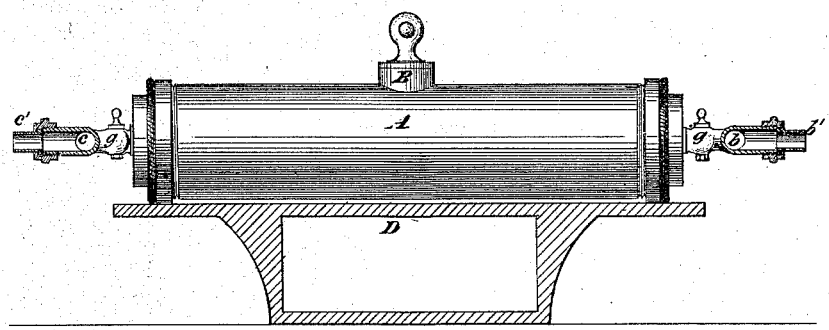
Figure 3:
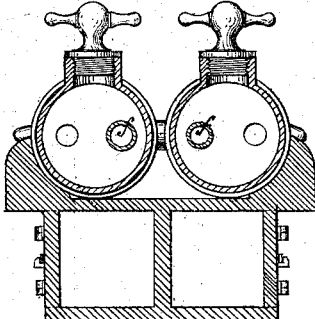

Figure 1 is a plan, with one-half in section;
Figure 2 is a longitudinal section; and
Figure 3, a transverse section.

Similar letters of reference indicate corresponding parts in the several figures.

A A are two vessels or holders, for containing the chemicals, arranged side by side upon a base or carriage, D.

These vessels are represented of cylindrical form, but may be of other form, and are made water-tight, and perfectly closed, except where connections are provided for the pipes, and where removable tight lids B B are provided for the introduction of the charges of chemicals.

At one end of the vessels there is provided a transverse pipe, *b*, and at the other end a similar pipe, *c*, the pipe *b* being furnished with a coupling-nozzle, *b'*, for connection with a service-pipe or street-hydrant, or for otherwise connecting it with the source of water-supply; and the pipe *c*, being provided with a coupling-nozzle *c'*, for connection with the pipe which is to convey the chemically-impregnated or gas-charged water to the fire.

The inlet-pipe *b* is connected, by stop-cocks *d d*, with one end of each of the vessels A, and the outlet-pipe *c* is connected, by stop-cocks *e e*, with the other end of each vessel.

The inlet and outlet-pipes *b* and *c* are also connected together by independent pipes *f f*, one passing through each vessel A, but having no direct communication therewith.

These independent pipes *f f* are represented as each furnished with a stop-cock, *g*, at its connection with the inlet and outlet-pipes *b c*, but it is only necessary to have such a stop-cock at the connection with either the inlet or outlet-pipe.

The independent pipes *f f* may be outside of the vessels A A, but when passing through them, as described and represented, they make the apparatus more compact, and are protected from injury.

The operation of the apparatus is as follows:

The vessels A A may be kept charged with chemicals and with the lids B B, and stop-cocks *d* and *e* closed ready for use.

When it is required to use it, the proper connections having been made at *b'* and *c'*, and the cocks *g g* opened, the water passes through the nozzle *b'*, pipes *b*, *f*, and *g*, and nozzle *c'*, and is at once thrown upon the fire.

The cocks *d* and *e* being then opened, water passes also through the vessels A A, and the chemicals contained therein, and absorbing or taking up with it a portion of such chemicals, is thrown upon the fire along with that which passes through the independent pipes *f f*.

The quantity of chemically-charged water is regulated by means of the stop-cocks *d e*.

When it is necessary to recharge either vessel with chemicals, the cocks *d e* are closed, and the lid B removed, and the chemicals are inserted through the opening of the said lid, the flow of water to the fire being in the mean time continued through the independent pipe *f*.

When the vessel A has been recharged, the lid B is screwed in or otherwise replaced and secured, and the cocks *d e* being opened, the supply to the fire of chemically-charged water is renewed.

In the double apparatus represented, the introduction of the charges is so arranged that there are always chemicals enough in one of the vessels A A, when those in the other are nearly exhausted, that a supply of chemically-charged water may be kept up from one vessel while the other is being recharged.

When the apparatus is single, or consists of only one of the vessels A A, with its connected pipes and cocks, the time required for recharging with chemicals is very short, and the flow of water through its pipe *f* is continued during such time.

The chemicals used may be of various kinds.

When it is desired to use such a chemical as does not evolve gas till thrown with the water upon the fire, that which forms the subject of Letters Patent of the United States, No. 85,434, dated December 29, 1868, may be used.

When the gas is to be generated in the apparatus the chemicals introduced into the vessel or vessels A A, may consist of carbonate or bicarbonate of soda and tartaric acid, in suitable proportions to generate carbonic acid, or with any other chemicals which produce carbonic-acid or other gas which will extinguish fire.

What I claim as my invention, and desire to secure by Letters Patent, is—

The combination of the chemical-charging or gas-generating vessel or vessels A A, the independent water-pipes $f f$, and a system of separate connections with the inlet and outlet-pipes, to operate substantially as and for the purpose herein described.

JOS. W. DOUGLAS.

Witnesses:
 JNO. M. DOUGLAS,
 DANIEL W. RAYMOND.